United States Patent [19]
Olson

[11] Patent Number: 5,353,183
[45] Date of Patent: * Oct. 4, 1994

[54] MAGNETIC HEAD ASSEMBLY FORMED COOPERATING HEAD SECTIONS BONDED TOGETHER USING CAPILLARY ATTRACTION

[75] Inventor: Jeffrey T. Olson, Encinitas, Calif.

[73] Assignee: Eastman Kodak Company, Rochester, N.Y.

[ * ] Notice: The portion of the term of this patent subsequent to Dec. 22, 2009 has been disclaimed.

[21] Appl. No.: 106,841

[22] Filed: Aug. 12, 1993

Related U.S. Application Data

[63] Continuation of Ser. No. 623,848, Dec. 7, 1990, abandoned.

[51] Int. Cl.⁵ ............... G11B 51/127; G11B 5/187
[52] U.S. Cl. ..................... 360/125; 360/122; 29/603
[58] Field of Search ............ 360/125, 126, 122; 29/603

[56] References Cited

U.S. PATENT DOCUMENTS

| | | | |
|---|---|---|---|
| 3,246,383 | 4/1966 | Peloschek et al. | 29/603 |
| 3,751,803 | 8/1973 | Fisher et al. | 29/603 |
| 3,824,685 | 7/1974 | Burch et al. | 29/603 |
| 3,843,968 | 10/1974 | Kroon | 360/123 |
| 3,845,550 | 11/1974 | Gooch et al. | 29/603 |
| 3,851,375 | 5/1974 | Koorneef | 29/603 |
| 3,909,932 | 10/1975 | Krdon | 29/603 |
| 4,901,179 | 2/1990 | Satomi at el. | 369/126 |
| 5,173,824 | 12/1992 | Olson | 360/125 |
| 5,231,555 | 7/1993 | Itoh et al. | 360/126 |

*Primary Examiner*—Robert S. Tupper
*Attorney, Agent, or Firm*—William F. Noval

[57] ABSTRACT

A magnetic head comprises a gapped media-contact surface formed by a pair of cooperating sections having corresponding planar surfaces abutted to each other. The planar surface of at least one of the sections has at least one narrow elongated slot containing a solidifiable bonding fluid, preferably epoxy, drawn therein under capillary attraction, the fluid upon solidifying bonding the cooperating sections together.

14 Claims, 6 Drawing Sheets

MAGNETIC HEAD ASSEMBLY FORMED COOPERATING HEAD SECTIONS BONDED TOGETHER USING CAPILLARY ATTRACTION

This application is a continuation of application Ser. No. 07/623,848 filed Dec. 7, 1990 now abandoned.

BACKGROUND OF THE INVENTION

1. Field Of The Invention

The present invention relates to a magnetic head assembly. More particularly, the invention relates to a method for bonding cooperating sections of a magnetic head together.

2. Description Of the Relevant Art

A magnetic head used in a magnetic tape recorder or a magnetic disk drive must meet demanding design specifications necessitated by high-density recording formats. Thus, in high density magnetic recorder apparatus, the media-bearing surface of a magnetic head must be durable in order to provide long head life despite high pressure contact over the head gap area with highly abrasive magnetic tape media such as chromium dioxide tape. Head materials should have compatible wear properties to prevent head separation loss. Moreover, a magnetic head assembly must have mechanical stability and be able to withstand environmental changes (temperature, humidity, shock and vibration) without performance degradation. Furthermore, it is highly desirable that the head assembly be conducive to a low-cost automated operation for producing magnetic heads reliably on a mass-production basis.

Various techniques are known in the art for assembling a magnetic head from cooperating pole pieces. U.S. Pat. Nos. 3,909,932 and 4,901,179 are exemplary wherein gap-forming pole pieces are aligned facing each other with a bonding material, such as glass, at the apex of a V-shaped groove extending beneath the gap region.

It is also known in the art to position pole pieces a fixed distance apart and draw bonding glass into the space therebetween by capillary action to form the gap. See for example U.S. Pat. Nos. 3,246,383; 3,751,803; and 3,824,685.

SUMMARY OF THE INVENTION

In view of the foregoing, it is an object of the present invention to provide a method of assembling a magnetic head from first and second sections that is of low cost and is readily suitable to a high-volume mass-production assembly operation.

In a presently preferred embodiment, the method comprises the steps of (i) forming from either section, or both sections, at a joint interface therebetween, a relatively narrow capillary slot and a fluid-receiving trough in intersecting relationship with the capillary slot, (ii) supplying a solidifiable bonding liquid into the trough while heating the first and second sections to a temperature in a bonding temperature range to cause the liquid supplied to be drawn from the trough into the capillary slot under capillary attraction, and (iii) curing the liquid to form a solid which bonds said first and second sections together by means of the solidifiable liquid in the trough and the solidifiable liquid drawn into the capillary slot.

Also, a new and improved magnetic head, manufactured by the method according to the invention, is provided. The magnetic head comprises a gapped media-contact surface formed by a pair of cooperating sections having corresponding planar surfaces abutted to each other, characterized by the planar surface of at least one of the sections having at least one narrow elongated slot containing a solidifiable bonding fluid drawn therein under capillary attraction, the fluid upon solidifying bonding the cooperating sections together.

A particular advantage of a magnetic head having bonded half sections in accordance with the present invention is that it is readily suited to a high-volume mass production operation. This is because bonding material needs to be deposited into only one end of the fluid-receiving trough. Each elongated slot, by virtue of its intersecting relationship with the fluid-receiving trough, is filled automatically by drawing bonding material from the trough under the influence of capillary attraction. Thus, for each magnetic head, bonding material deposited at one point serves to fill the fluid-receiving trough and each capillary slot, thereby bonding (and reinforcing) the two half sections of the head assembly together in each of two orthogonal directions.

A further advantage of the present invention is that multiple magnetic heads can be bonded simultaneously. That is, by temporarily coupling corresponding half sections of multiple heads together along a common interface, a single fluid-receiving trough can serve for supplying bonding material to all head assemblies at the same time.

These advantages, as well as other advantages, will become more apparent in the detailed description of a preferred embodiment presented below.

BRIEF DESCRIPTION OF THE DRAWINGS

The invention will be described with reference to the accompanying drawings, wherein.

DETAILED DESCRIPTION OF A PREFERRED EMBODIMENT

Figure 1:
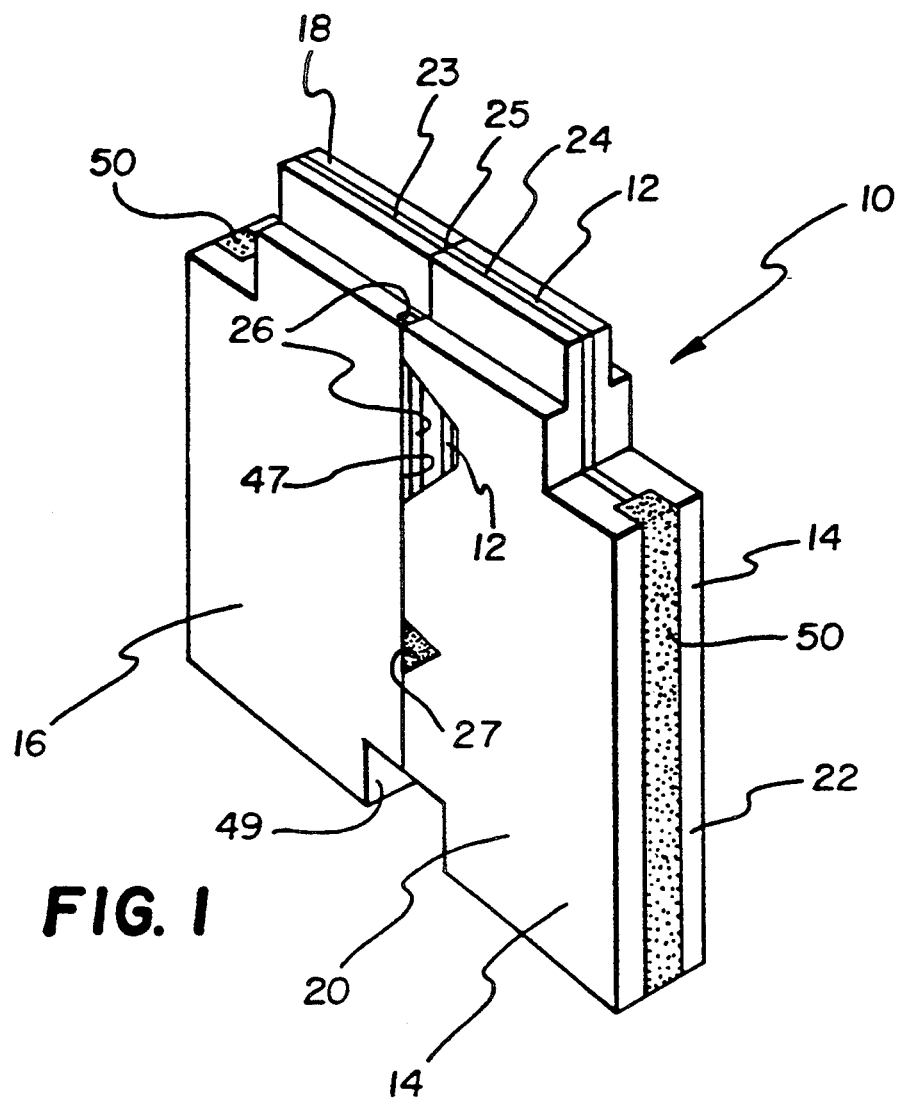
FIG. 1 is a perspective view of a magnetic head assembly in accordance with the invention.

FIG. 1 shows generally a magnetic head 10, manufactured in accordance with the present invention, comprised of a relatively thin magnetic core 12 sandwiched between two non-magnetic substrates 14. The head 10 is assembled generally from four quarter sections, denoted 16, 18, 20, 22. These four quarter sections are bonded together in two separate steps. The first bonding step, which is conventional, bonds two quarter sections together to form a half section; the second bonding step, which is in accordance with the teachings of the present invention, bonds two half sections together to form the magnetic head 10.

Prior to the first bonding step, poles 23, 24, on opposite sides of a gap 25 of the core 12, are sputter deposited, by means well known in the art. Preferably, a pole of full width is deposited on two of four quarter sections. Alternatively, a pole of half width can be deposited on all four quarter sections, and corresponding quarter sections are bonded together (pole to pole) to form a pole of full width.

Each pole of the core 12 may comprise a single film of magnetic material or, preferably for high frequency recording, may be a laminated structure comprised of thin layers of magnetic material alternating with even thinner layers of a dielectric material. The magnetic material can be, for example, FeRuGaSi, whereas the dielectric can be $SiO_2$, Zr oxide, or the like.

The first bonding operation serves to form the two halves of the magnetic head 10 that lie on opposite sides of the gap 25. For that purpose, each of the two quarter sections having a pole of full width deposited thereon is bonded, respectively, to one of the other two quarter sections, with the pole sandwiched between the two quarter sections bonded. In this conventional bonding operation, an epoxy is coated directly on one or both of the surfaces to be bonded, preferably by means of a so-called oil dipper tool.

Figure 2:
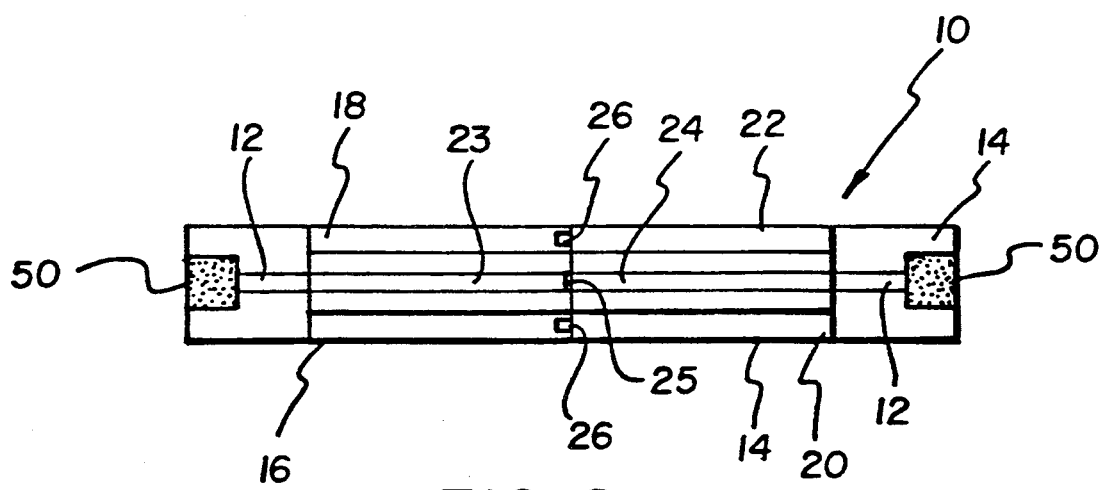
FIG. 2 is a plan view of the media-contact surface of the head of FIG. 1.

The second bonding operation, which is the essence of the present invention, serves to bond the two half sections of the magnetic head 10 together, thereby forming the composite head structure of FIG. 1. As is explained in detail hereinbelow, this second bonding operation is achieved by clamping corresponding planar surfaces of each half section together in abutting engagement, then heating the two halves to a bonding temperature while drawing a solidifiable bonding fluid, preferably epoxy, between the two planar surfaces under the influence of capillary attraction. The fluid drawn between the two half sections solidifies and thereby bonds the two half sections together. FIG. 2, which is a plan view of the gapped media-contact surface of the magnetic head 10, illustrates the two bonding planes.

In practicing the presently preferred method of the invention, epoxy is drawn between the two half sections by means of an elongated capillary slot 26 (FIG. 2) cut from each non-magnetic substrate 14 of the aforementioned planar surface of one of the half sections of the magnetic head 10. Each slot 26 extends the full depth of the half section and, as shown, the two slots 26 are located on opposite sides of the core 12. Epoxy is supplied to each capillary slot 26 by means of depositing epoxy into a fluid-receiving trough 27 (FIG. 1) cut from the corresponding planar surface of the other half section of the magnetic head 10. The trough 27 is orthogonal to the core 12 and extends across the full width of the half section. The trough 27 thereby cuts across each capillary slot 26 when the respective planar surfaces of the two half sections of the magnetic head 10 abuttingly engage each other.

The trough 27 is filled with epoxy which bonds the two half sections together at their common interface orthogonal to the core 12. Both elongated slots 26 are also filled with epoxy when epoxy is drawn from the trough 27 under the influence of capillary attraction. The epoxy in the slots 26 serves to further bond the two half sections together, on both sides of the core 12, orthogonal to the bond along the trough 27.

Figure 3:
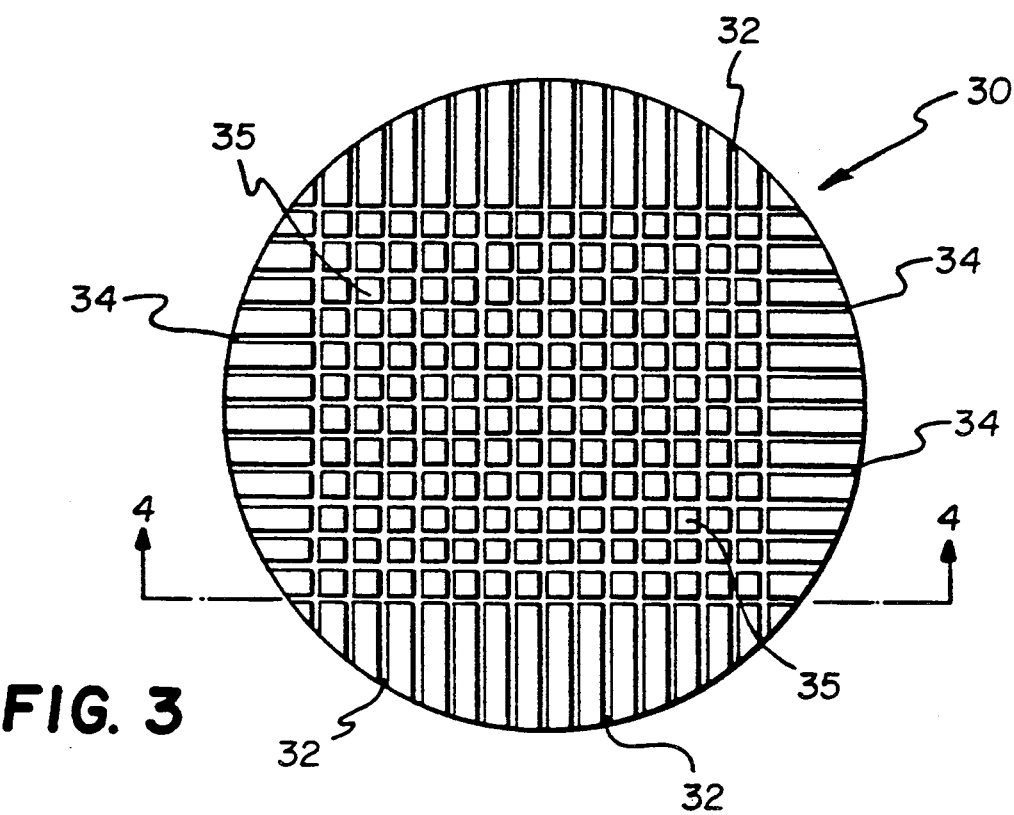
FIGS. 3 through 13 illustrate process steps involved in the manufacture of the magnetic head.

FIGS. 3 through 13 illustrate more clearly the fabrication and assembly process for the magnetic head 10. FIG. 3 is a plan view of a wafer 30 which is made of a material suitable for the aforementioned non-magnetic substrate 14. For that purpose, I selected MnNi oxide because of its excellent wear-resistant property. Furthermore, MnNi oxide and the core material (FeRuGaSi and/or a dielectric such as Zr oxide) have respective thermal expansion coefficients that are well matched over a temperature range of 20° C. to 800° C. FIG. 3 shows orthogonal X-Y dicing lanes 32, 34 cut from the wafer 30. The lanes serve for subsequently dicing the wafer 30 into a plurality of head quarter sections, denoted 35.

Figure 4:
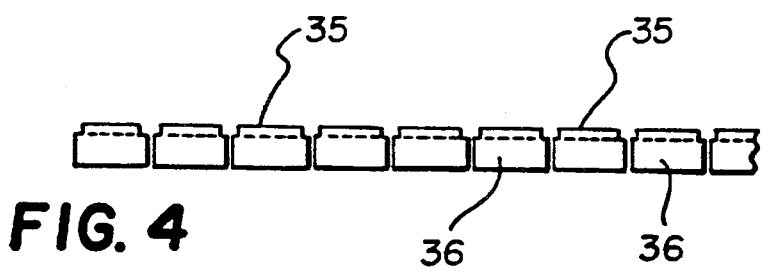

FIG. 4, which is an enlarged cross-sectional view of the wafer 30 along the lines 4—4 of FIG. 3, shows that the wafer 30 is first broken along the dicing lanes 32 (by means of a parting tool) into columnar strips 36 of quarter sections 35.

Figure 5:
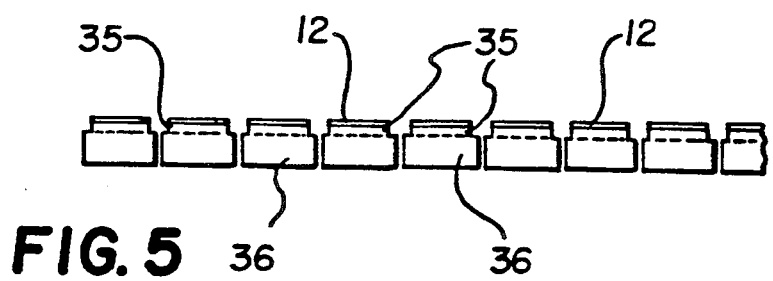

FIG. 5 shows that each quarter section 35 of each columnar strip 36 is then sputter deposited with a magnetic material which serves as one of the poles of the core 12 of the magnetic head 10. Preferably, the core 12 comprises a multilayer structure having alternating layers of the magnetic material FeRuGaSi and the dielectric Zr oxide. Each magnetic layer and each dielectric layer are sputter deposited, by means well known in the art, to a thickness of 2 $\mu$m and 100 nm, respectively. Typically, each laminated pole includes a total of ten layers of magnetic material, to form essentially a 20$\mu$ thick multilayer.

Figure 6:
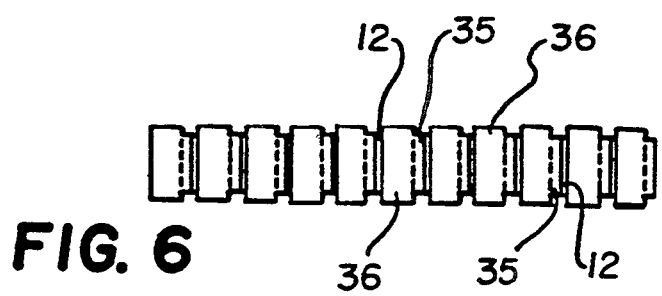

The deposited core 12 of each quarter section 35 is bonded to the bottom surface of the corresponding quarter section of the adjacent columnar strip (FIG. 6). Preferably, this is done, as described previously, by first applying a liquid epoxy by means of an oil dipping tool to the core 12 and the bottom surface of each quarter section 35. Each strip 36 is then rotated ninety degrees (90°) sideways, and columnar strips are then clamped together (by means not shown) until the epoxy solidifies, thereby bonding corresponding quarter sections of adjacent strips together. Each pair of bonded quarter sections forms a half section, as described in detail hereinbelow.

Figure 7:
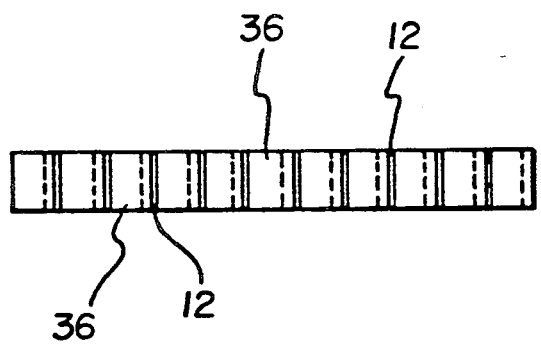

FIG. 7 shows that the bonded columnar strips 36 are then ground to a flat finish on their top and bottom surfaces, as viewed in the drawing.

Figure 8:
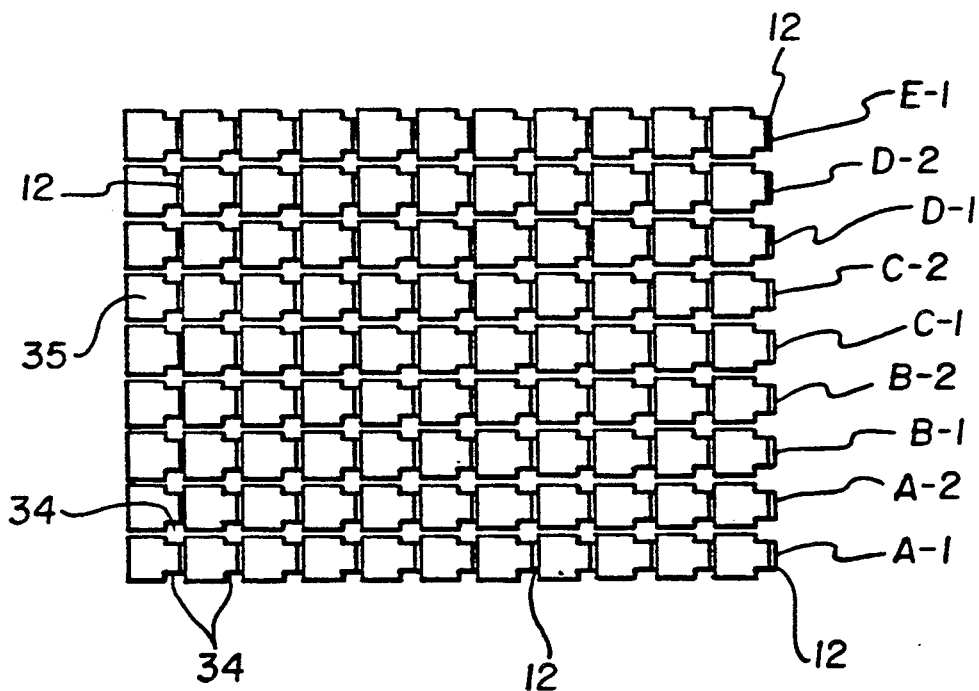

FIG. 8, which is a plan view, shows that the bonded columnar strips 36 are sliced, perpendicular to the plane of each core 12, into rows. The best alignment of opposing pole pieces occurs when a half section from one row is bonded to the corresponding half section of the adjacent row. Accordingly, it is preferred that adjacent rows, denoted A-1, A-2; B-1, B-2; C-1, C-2, etc., are paired.

Figure 9:
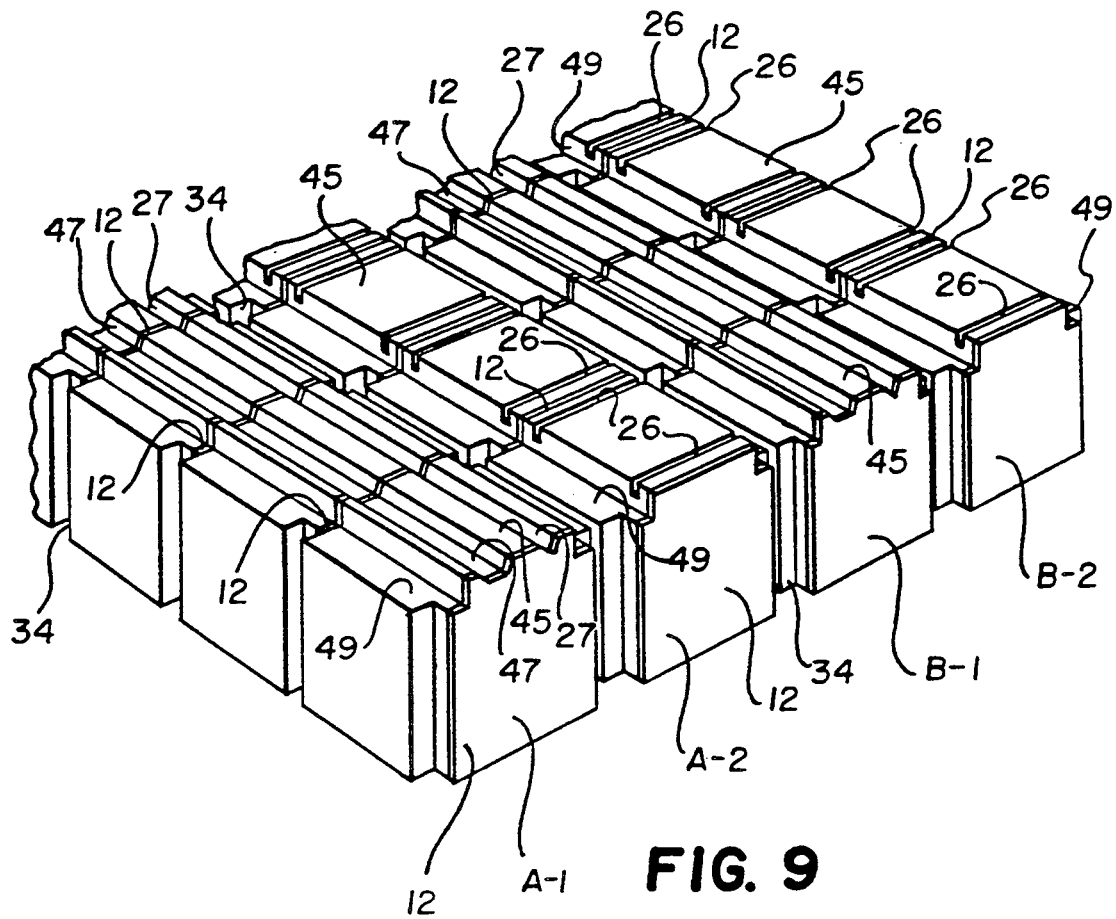

FIG. 9, which is a partial perspective view, shows that the aforementioned fluid-receiving trough 27 is cut from the upwardly facing planar surface 45 of every second row of bonded half sections. As shown, each trough 27 is cut along an entire row, orthogonal to each core 12 in that row. In addition, a groove 47 is cut from the same set of alternate rows parallel with the respective trough 27. Each groove 47 (also shown in FIG. 1) serves as a window for a head coil.

FIG. 9 also shows that the aforementioned capillary slots 26 are cut from the upwardly facing planar surface 45 of the alternate rows of bonded half sections. To that end, a pair of spaced capillary slots 26 is cut for each core 12, with each core being parallel with and midway between a corresponding pair of slots 26. Thus, each capillary slot 26 in one row of bonded half sections is orthogonal to and co-planar with the fluid-receiving trough 27 cut from the adjacent row of half sections.

FIG. 9 also illustrates that a right-angled shoulder 49 is cut from opposing edges of each row of bonded half sections, co-planar with and parallel to each trough 27. Each shoulder 49, which is cut with a fine grit dicing blade, serves advantageously for aligning opposing poles across the gap 25 when two half sections of a magnetic head 10 are bonded together.

Figure 10:
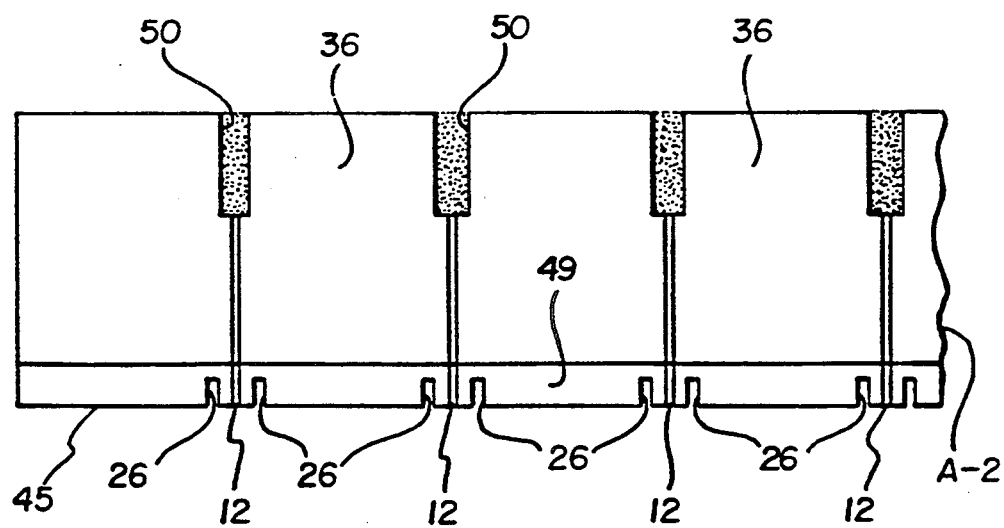

FIG. 10 is a plan view of a portion of the row A-2 of bonded half sections with its capillary slots 26 facing downwardly. As shown, two slots 26 are cut from the planar surface 45 of each bonded half section, parallel with and on opposing sides of each core 12. In a presently preferred embodiment, each slot 26 is approximately one (1) mil wide and, after surface lapping, is approximately three (3) mils deep.

FIG. 10 also shows a bonding notch 50 cut in the plane of the core 12 from the surface of each bonded half section opposite the capillary slots 26. As shown, the notch 50 is somewhat wider than the plane of the core 12. (A similar notch 50 is cut from all rows of bonded half sections.) The notch 50 is filled with epoxy at this time. This epoxy functions to provide added structural support to each bonded half section on each side of the core 12.

Figure 11:
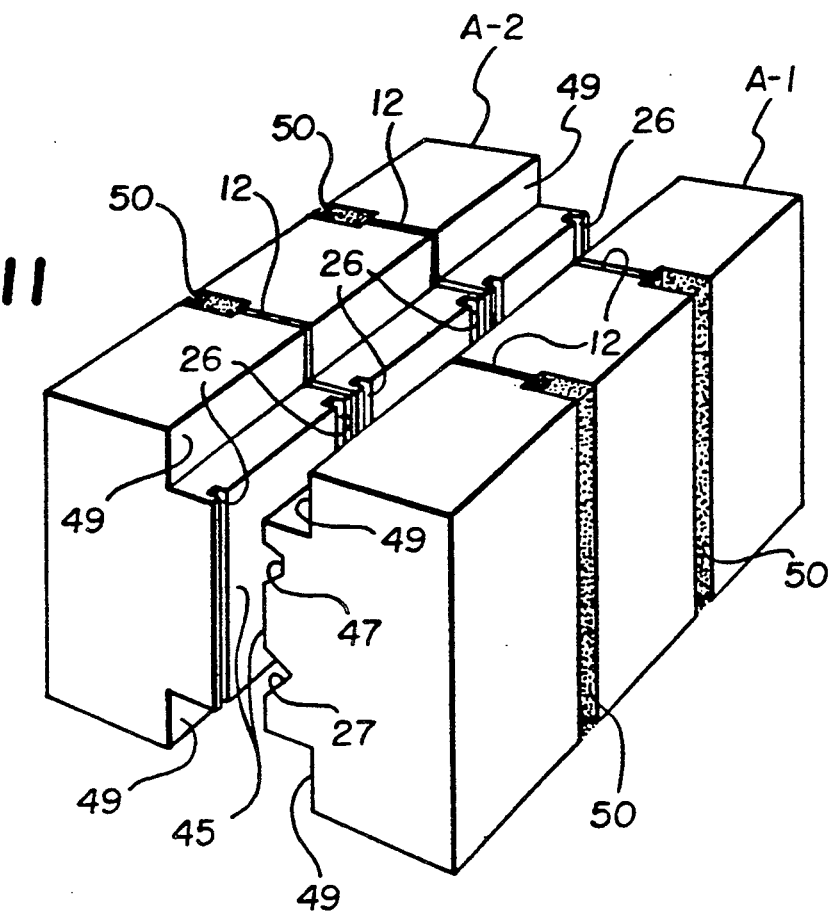

FIG. 11 shows corresponding half sections of a portion of rows A-1 and A-2 oriented prior to bonding to each other. In the actual bonding position, the row A-1 of bonded half sections is clamped (by means not shown) to the row A-2 of half sections so that relatively constant pressure is applied to their corresponding planar surfaces 45 when they abuttingly engage each other. At the joint interface formed by the two planar surfaces, the fluid-receiving trough 27 lies in intersecting relationship with the capillary slots 26, and the cores 12 of the row A-1 are aligned with corresponding cores of the row A-2. The alignment of the respective cores is facilitated by means of the right-angled shoulders 49 cut from the top and bottom corners of the planar surfaces 45.

Actual bonding is accomplished by first heating the bonded half sections to a temperature in a bonding temperature range. In a presently preferred embodiment, the MnNi oxide is heated to a temperature of approximately 75° C. With the non-magnetic substrate heated, liquid epoxy is supplied by means of the aforementioned oil dipper tool, to one end of the fluid-receiving trough 27. The heated substrate helps to lower the viscosity of the epoxy and to thereby draw the epoxy along the entire length of the V-shaped trough 27. As the epoxy flows, it is drawn up into each slot 26 under capillary attraction, thereby filling each slot.

The bonded half sections are then heated to an elevated temperature of approximately 120° C. As the epoxy is heated, it hardens thereby bonding corresponding half sections to each other.

I have found that the trough 27 fills with epoxy as epoxy is drawn into each slot 26 under capillary action. Only a small amount of epoxy actually leaves each slot 26 and enters the coil aperture 47 which, of course, also lies in intersecting relationship with each capillary slot. If the capillary slots are too large, however, epoxy flows too vigorously and fills the coil aperture. With each capillary slot approximately 1 mil wide and 3 mils deep, spillage into the aperture 47 has not been a problem. As shown, the epoxy that does enter the aperture 47 merely collects at aperture corners common to the plane of slot 26. Thus, it is not necessary to initially cut a coil aperture that is oversized. This is an important consideration because, for a fixed permeability, a small coil aperture perimeter increases head efficiency and minimizes inductance.

Figure 12:
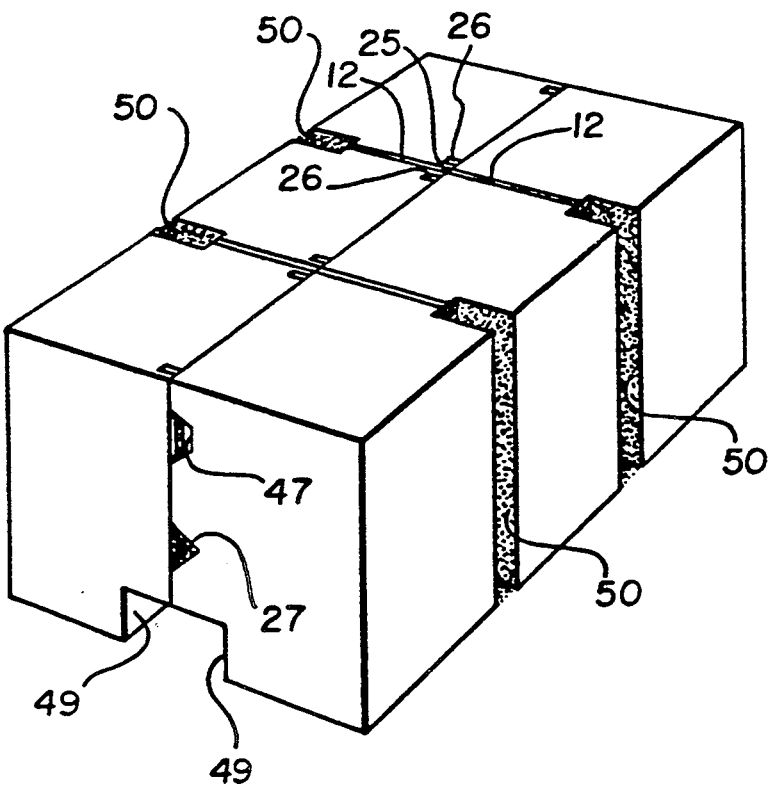

FIG. 12 shows corresponding half sections bonded together with their respective top surfaces ground to a final height.

Figure 13:
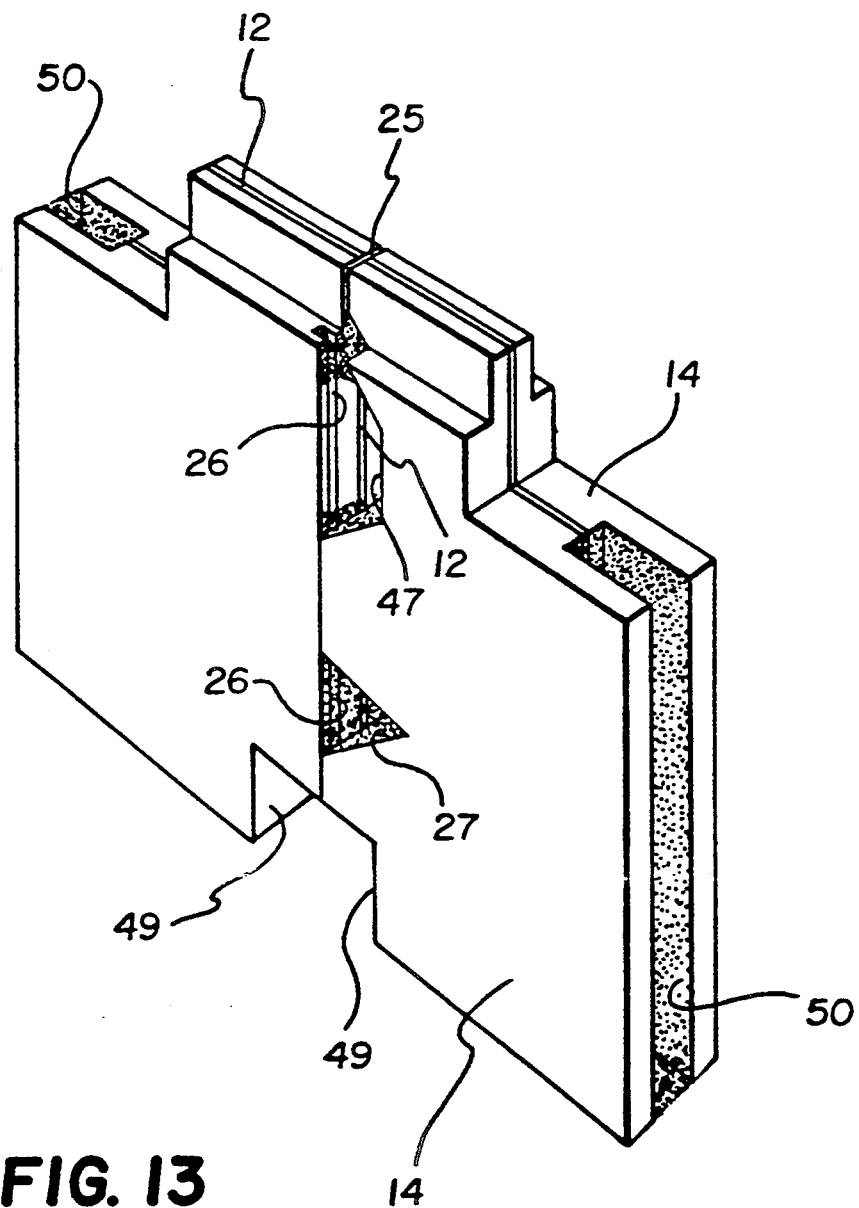

FIG. 13 shows that the bonded half sections are then cut and ground to a desired final thickness. In doing so, the magnetic head 10 is chosen to have a desired final configuration of approximately 2 mm by 2 mm outer dimension for its major surface; the media-contact surface is lapped to form a gap depth of 25 $\mu$m which provides an estimated head life of 2500 hours.

In a presently preferred embodiment, epoxy type 410-7, purchased from the Ablestick Company of Gardena, Calif., is utilized. This epoxy is particularly advantageous because in filtered form (impurities removed), a bonding line of a width less than 0.26 micron can be formed.

It will be understood by those skilled in the art that other fluid bonding materials, such as glass, can be utilized in accordance with the teachings of the present invention. If glass were to be used, after liquefied glass is drawn by capillary action into the slots 26, the core sections of the magnetic head assembly would be cooled to change the glass from a liquid state to a solid.

The invention has been described in detail with reference to the figures; however, it will be appreciated that variations and modifications are possible within the spirit and scope of the invention. For example, I have shown that "capillary attraction" is particularly advantageous in the manufacture of a composite head having a gapped core sandwiched between non-magnetic substrates. It will be understood by those skilled in the art, however, that capillary attraction, in accordance with the teachings of this invention, is also suitable for bonding half sections together comprised essentially of magnetic material.

It will also be understood by those skilled in the art that capillary slots 26 can be cut from the planar surface 45 of both half sections to be bonded together. When slots 26 are cut from both half sections, corresponding slots from bonded half sections can be aligned or offset from each other. If, on the other hand, capillary slots 26 are cut from only one half section, as is the case with the preferred embodiment described herein, such slots may be cut from the half section from which the fluid-receiving trough 27 is formed.

What is claimed is:

1. A gapped magnetic head comprising a first head section and a second head section abutted against each other at a common interface, said magnetic head further comprising:
   (a) two non-magnetic substrates in each of said sections; and
   (b) magnetic cores sandwiched between each pair of said non-magnetic substrates, wherein said first head section includes at least one narrow elongated slot extending therethrough, positioned on one side but not in contact with said magnetic core and parallel to and contiguous with said common interface, for receiving a solidifiable bonding fluid drawn therein under capillary action, the fluid, upon solidifying, forming a column of solid bonding material which bonds said head sections together.

2. A gapped magnetic head as defined in claim 1 in which said bonding material is epoxy.

3. A gapped magnetic head as defined in claim 1 in which said second section includes at least one narrow elongated slot extending therethrough, positioned on one side but not in contact with said magnetic core and parallel to and contiguous with said common interface, for receiving a solidifiable bonding fluid drawn therein under capillary action, the fluid, upon solidifying, forming a column of solid bonding material which bonds said head sections together.

4. A gapped magnetic head as set forth in claim 1 further characterized in that said magnetic cores are aligned with each other when said head sections are abutted at said common interface, with said gapped magnetic head further including a magnetic transducing gap extending between the aligned magnetic cores.

5. A gapped magnetic head as set forth in claim 4 further characterized in that said aligned magnetic cores are in direct contact with one another after the had sections are bonded together.

6. A gapped magnetic head as defined in claim 4 further characterized in that the magnetic transducing gap is of insufficient size to allow a solidifiable bonding fluid to flow between said head sections.

7. A gapped magnetic head having a magnetic transducing gap, said head comprising:
   (a) a first head section comprised of a magnetic core sandwiched between a pair of non-magnetic substrates;
   (b) a second head section comprised of a magnetic core sandwiched between a pair of non-magnetic substrates and abuttingly engaging said first head section wherein a common interface is established therebetween; and
   (c) each non-magnetic substrate of at least one of said head sections having a relatively narrow elongated column of solid bonding material which is not in contact with said magnetic core, said column being contiguous to said common interface and parallel with aid sandwiched core, said column being fabricated by filling a relatively narrow elongated slot in each non-magnetic substrate of said head section with bonding material introduced therein via capillary action.

8. A gapped magnetic head as defined in claim 7 in which said bonding material is epoxy.

9. A gapped magnetic head as set forth in claim 7 further characterized in that said magnetic core of said first had section is aligned with said magnetic core of said second head section with said magnetic transducing gap extending between said magnetic cores.

10. A gapped magnetic head as set forth in claim 9 further characterized in that the aligned magnetic cores are in direct contact with one another after the head sections are bonded together.

11. A gapped magnetic head as defined in claim 9 further characterized in hat the magnetic transducing gap is of insufficient size to allow a solidifiable bonding fluid to flow between said head sections.

12. A gapped magnetic head as set forth in claim 7 wherein said first head section further comprises a rod of solid bonding material at the common interface, said rod being remotely located from said gap and extending through its sandwiched core to the other substrate and fabricated by filling with bonding material an open ended fluid receiving trough in said first head section.

13. A gapped magnetic head as set forth in claim 12 wherein said column extends in intersecting relationship with said rod.

14. A gapped magnetic head comprising a first said section and a second head section abutted against each other at a common interface, said magnetic head further comprising:
   (a) two non-magnetic substrates in each of said sections; and
   (b) magnetic cores sandwiched between each pair of said non-magnetic substrates, wherein said first head section includes at least one elongated column of solid bonding material extending through said first head section positioned on one side but not in contact with said magnetic core and parallel to and contiguous with said common interface, formed from a solidifiable bonding fluid drawn under capillary action into at least one narrow elongated slot included in aid first head section, the fluid upon solidifying bonding said head sections to each other.

* * * * *